(12) United States Patent
Roe

(10) Patent No.: US 10,259,280 B1
(45) Date of Patent: Apr. 16, 2019

(54) LIGHTWEIGHT AMPHIBIOUS VEHICLE

(71) Applicant: Richard Darin Roe, Midland, TX (US)

(72) Inventor: Richard Darin Roe, Midland, TX (US)

(*) Notice: Subject to any disclaimer, the term of this patent is extended or adjusted under 35 U.S.C. 154(b) by 0 days.

(21) Appl. No.: 15/630,269

(22) Filed: Jun. 22, 2017

Related U.S. Application Data

(60) Provisional application No. 62/365,669, filed on Jul. 22, 2016.

(51) Int. Cl.
*B60F 3/00* (2006.01)
*F16H 9/08* (2006.01)
*B63H 16/20* (2006.01)

(52) U.S. Cl.
CPC .......... *B60F 3/0007* (2013.01); *B60F 3/003* (2013.01); *B60F 3/0069* (2013.01); *B63H 16/20* (2013.01); *B63H 2016/202* (2013.01); *F16H 9/08* (2013.01)

(58) Field of Classification Search
CPC ...... B60F 3/0007; B60F 3/0069; B63H 16/20; B63H 2016/202; F16H 9/08; F16H 9/16
See application file for complete search history.

(56) References Cited

U.S. PATENT DOCUMENTS

| | | | | |
|---|---|---|---|---|
| 2,930,340 A * | 3/1960 | Sessions | ............... | B60F 3/0069 440/30 |
| 4,533,330 A * | 8/1985 | Chun | ................... | B60F 3/0069 280/213 |
| 4,597,353 A * | 7/1986 | Takezono | ............. | B60F 3/0084 301/1 |
| 5,178,088 A * | 1/1993 | Howard | ................ | B60F 3/0069 440/100 |
| 5,381,752 A * | 1/1995 | Eerdmans | ............. | B60F 3/0007 440/12.62 |

FOREIGN PATENT DOCUMENTS

| CN | 101922537 A | * | 12/2010 | |
|---|---|---|---|---|
| FR | 2566714 A1 | * | 1/1986 | ............ B60F 3/0069 |

* cited by examiner

*Primary Examiner* — Ajay Vasudeva
(74) *Attorney, Agent, or Firm* — Eldredge Law Firm, LLC; Richard Eldredge; Beth Felix

(57) ABSTRACT

A lightweight amphibious vehicle system enables a user to traverse the land or water in the same craft. The wheels have paddles attached on the sides and are powered by a transmission that multiplies the force of a user to enable the system to travel without great effort. The transmission is driven by pedal power input by the user.

3 Claims, 6 Drawing Sheets

LIGHTWEIGHT AMPHIBIOUS VEHICLE

BACKGROUND

1. Field of the Invention

The present invention relates generally to recreational vehicle systems, and more specifically, to an amphibious vehicle system for transporting a person over land and water.

2. Description of Related Art

Recreational vehicle systems are well known in the art and are effective means to provide enjoyment by moving a person from one place to another. For example, FIG. 1 depicts a conventional amphibious vehicle system 101 having a hull 103, two axles 105, 107 each with two wheels 109, 111 being rotated by a motor 113 and transmission 115. During use, the vehicle is driven by a user 117 and is configured to run both on land and water.

One of the problems commonly associated with system 101 is limited use. For example, its mobility necessitates a heavy motor reducing the agility of the vehicle in addition to the undesirable noise created by motor.

Accordingly, although great strides have been made in the area of amphibious vehicle systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
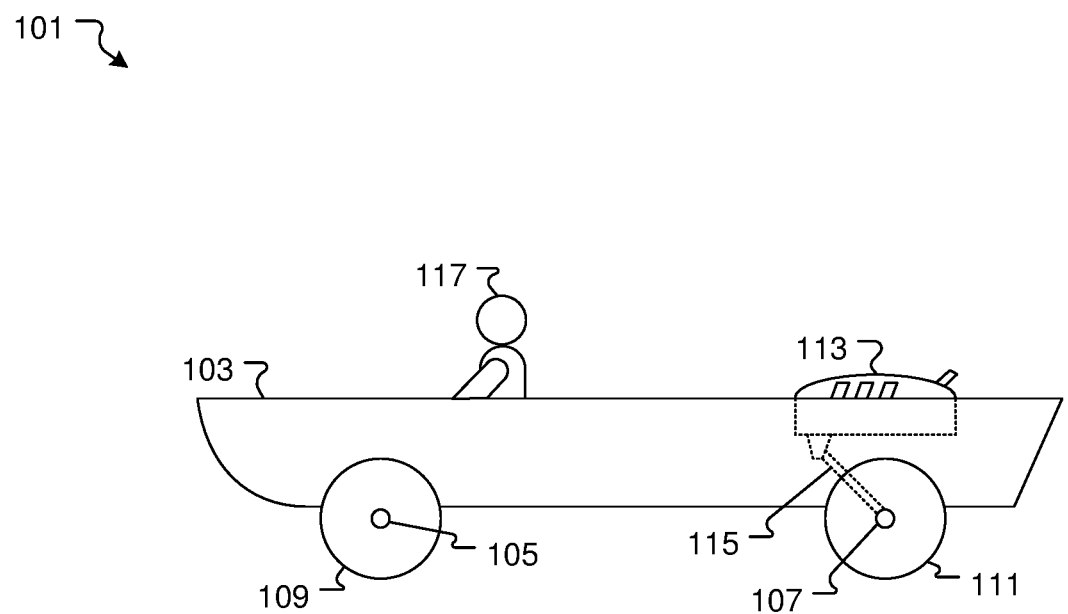
FIG. 1 is a side view of a common amphibious vehicle system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional amphibious vehicle systems. Specifically, the system of the present application it light weight and provides means to quickly traverse land and water. In addition the system of the present application can be powered by the user greatly reducing the noise produced by the vehicle. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
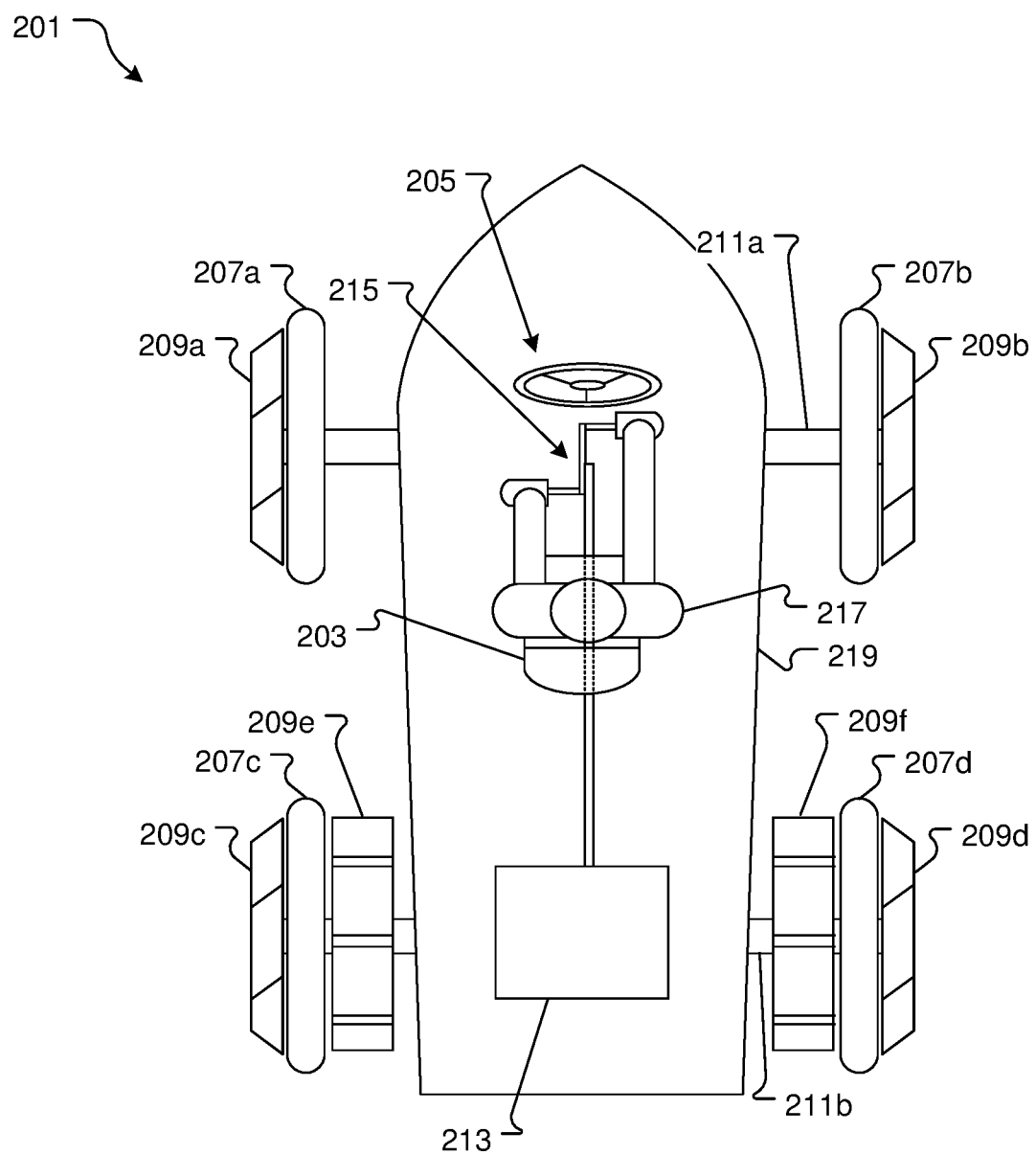
FIG. 2 is a top view of a lightweight amphibious vehicle system in accordance with a preferred embodiment of the present application.

Referring now to the drawings wherein like reference characters identify corresponding or similar elements throughout the several views, FIG. 2 depicts a top view of a lightweight amphibious vehicle system in accordance with a preferred embodiment of the present application. It will be appreciated that system 201 overcomes one or more of the above-listed problems commonly associated with conventional amphibious vehicle systems.

In the contemplated embodiment, system 201 includes a transmission 213 in communication with wheels 207 via axles 211. Each wheel 207 having a paddle 209 attached to the side thereof. The transmission 213 is in communication with a set of pedals 215. The pedals 215 being situated within reach of a user 217 resting in a seat 203. The seat 203 also having a steering device 205 in proximity. The transmission 213 and other parts being housed in a buoyant hull 219.

In use the user 217 rests in the seat 203, and rotates pedals 215 with their legs, this generated force transferred to and maximized by the transmission 213 that causes the wheels 207 and paddles 209 to rotate via axles 211, propelling the system 201 across land or water.

It should be appreciated that one of the unique features believed characteristic of the present application are the paddles 209 and transmission 213 that allow the user 217 to move on both water and land with agility and in near silence.

It will also be appreciated that any items common to amphibious vehicles such as oars, lights, cup holder or the like could also be used with system 201 and not deviate from the intent of this disclosure.

While paddles 209 have been depicted it is contemplated that nay means of displacing water with the result of forward motion is contemplated.

Figure 3:
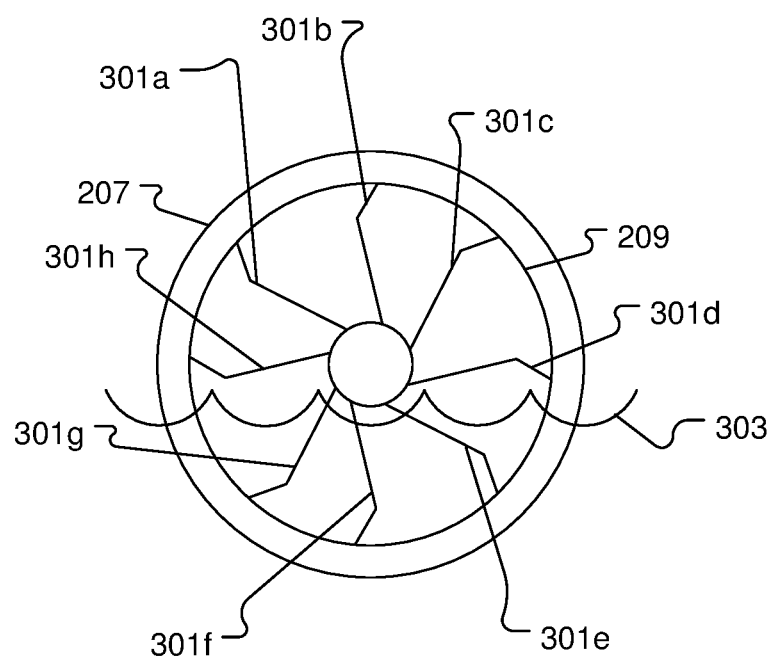
FIG. 3 is a side view of the wheels of FIG. 2

Referring now to FIG. 3 the wheels 207 and paddles 209 are depicted. The paddles 209 including blades 301. The water level 303 is also indicated. It will be appreciated that blades 301 are depicted with an angled break to allow the blade 301 to efficiently contact water 303 throughout a revolution of the wheel 207 or axle 211. While the blades 301 are depicted in a fan style arrangement any configuration or type of blades are anticipated.

Figure 4A:
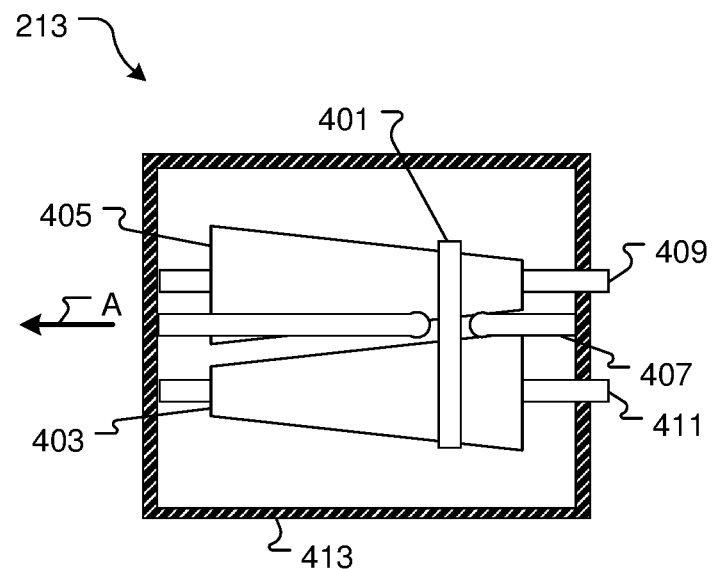
FIGS. 4A and 4B are top views of the transmission of FIG. 2.
Figure 4B:
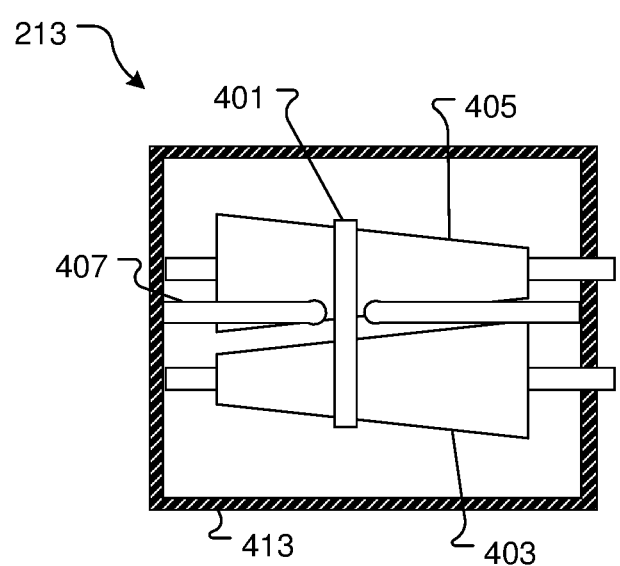

Referring now to FIGS. 4A and 4B the transmission 213 is depicted in use. The transmission 213 including one or more elastic bands 401 in communication with a first and second conical cylinders 403, 405 respectively. The elastic band 401 is moved perpendicular to the cylinders by selectors 407. The conical cylinders 403, 405 are attached to axles 409, 411 respectively. The parts being suspended in a housing 413. It will be appreciated that the conical cylinder 403, 405 and elastic band 401 allow for infinite gear ratios as selector 407 moves band 401 to the optimal position on the cylinders as depicted by motion A allowing for operation in water and other situations requiring high amounts of force.

Figure 5:
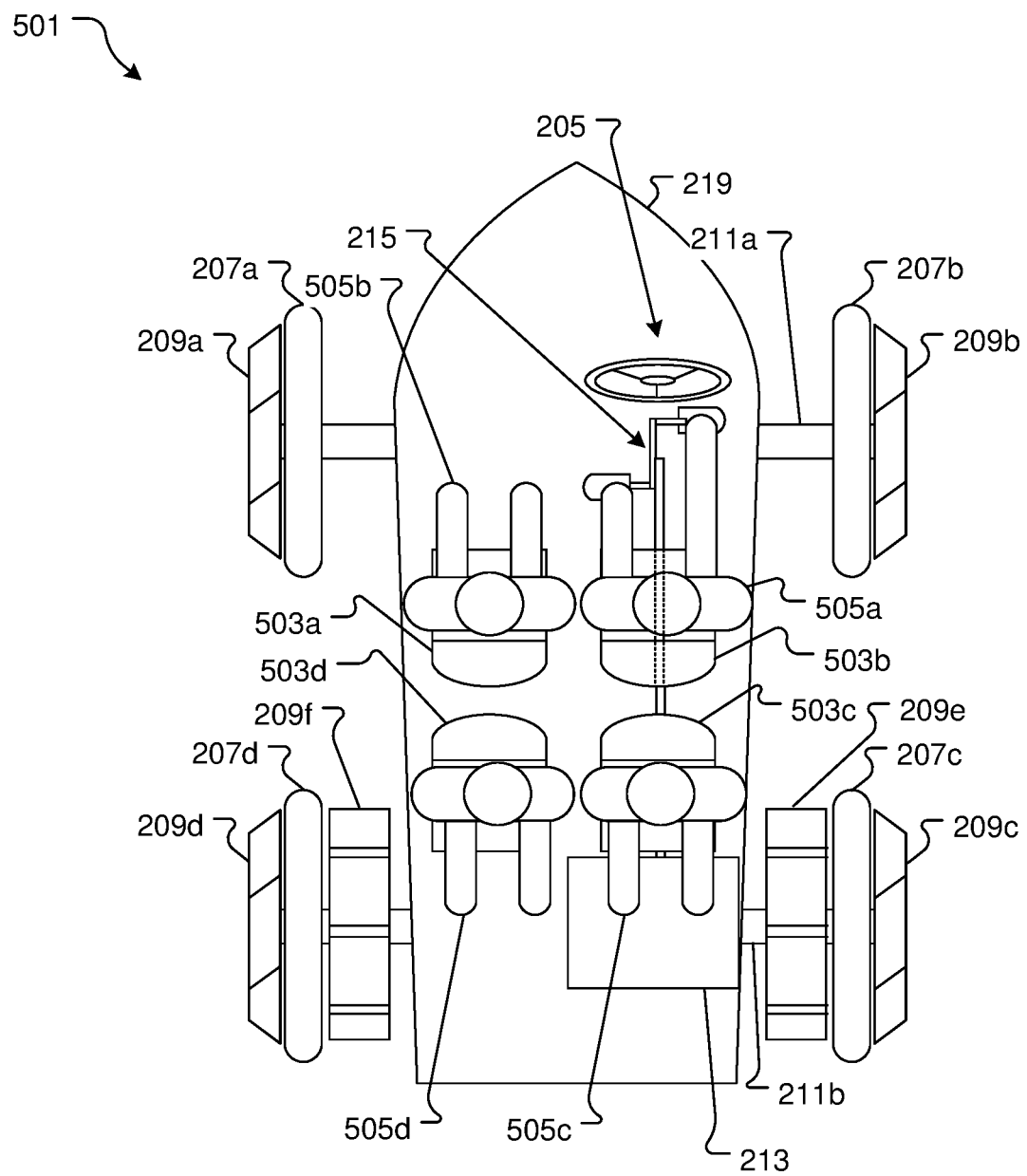
FIG. 5 is a top view of an alternative embodiment of the system of FIG. 2.

Referring now to FIG. 5 an alternative embodiment of system is depicted. The embodiment 501 including the same components and features as 201 with the addition of multiple seats 503, to accommodate users 505. It will be appreciated that more than one seat 503 allow for users 505 to be transported by the system 501. It will also be appreciated that adding more than one set of pedals 215 that multiple users could be used to further power the system 501. It is also contemplated but not shown that the system could be scaled and modified to function in a remote controlled variations without deviating from the intent of this disclosure.

Figure 6:
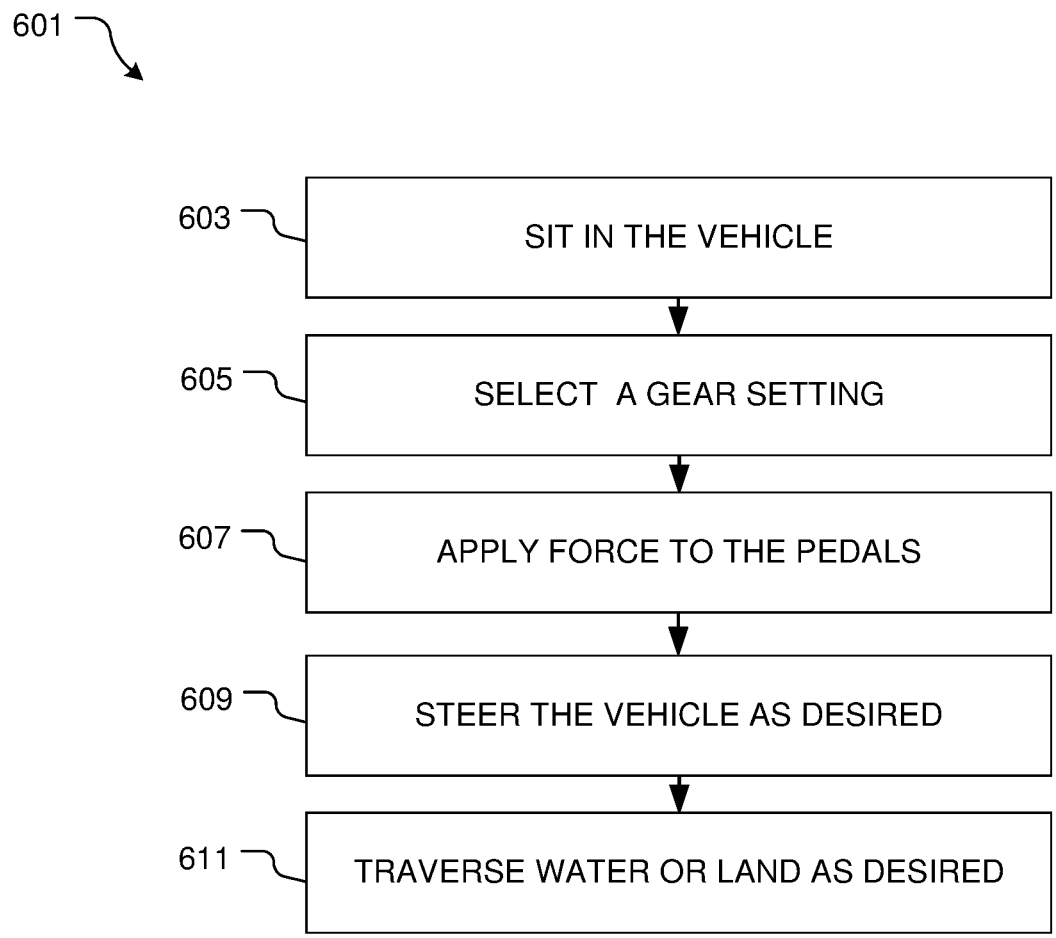
FIG. 6 is a diagram of the preferred method of use of the system of FIG. 2.

Referring now to FIG. 6 the preferred method of use of the system 201 is depicted, the method 601 including sitting in the vehicle 603, selecting the gear setting 605, applying force to the pedals 607, steering the vehicle as desired 609 and traversing water or land as desired 611.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A lightweight amphibious vehicle system comprising:
a buoyant hull, having a body;
a transmission carried by the body of the buoyant hull, the transmission having:
  a housing with an inner cavity;
  a first conical cylinder rotatably attached within the inner cavity;
  a second conical cylinder rotatably attached within the inner cavity;
  an elastic band that engages both the first conical cylinder and the second conical cylinder;
  a first selector slidingly engaged with the housing; and
  a second selector slidingly engaged with the housing;
  wherein the first selector and the second selector transversely move the elastic band relative to an elongated axis of the first conical cylinder;
an axle having at least one wheel attached thereto;
a paddle secured to the axle;
wherein the system is able to travel over land and though water.

2. The system of claim 1 wherein the paddle is in proximity to a seat and steering device.

3. The system of claim 1 wherein a plurality of seats are attached to the buoyant hull.

* * * * *